Figures 4, 5, 6:
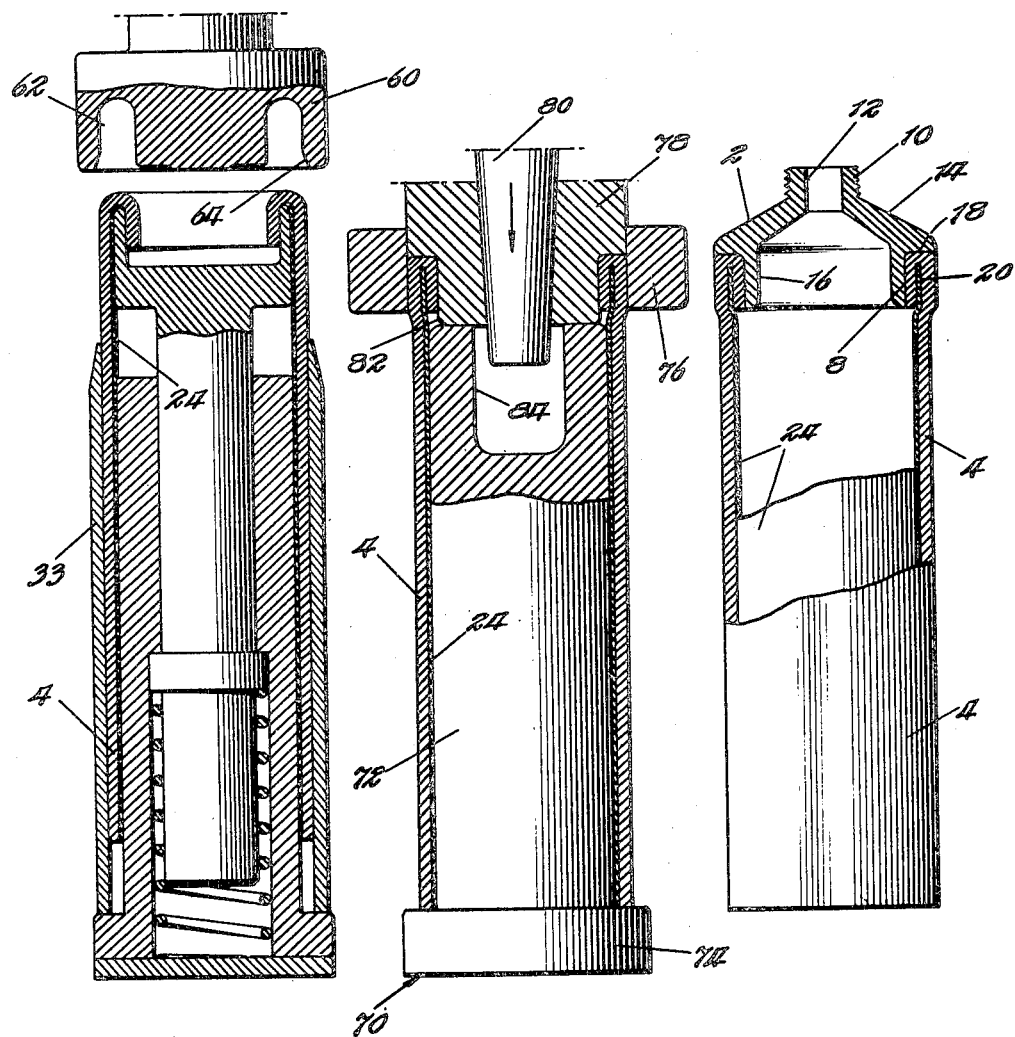

Oct. 25, 1949.    P. R. HOOPES    2,485,885
COLLAPSIBLE TUBE
Filed March 21, 1944    2 Sheets-Sheet 1
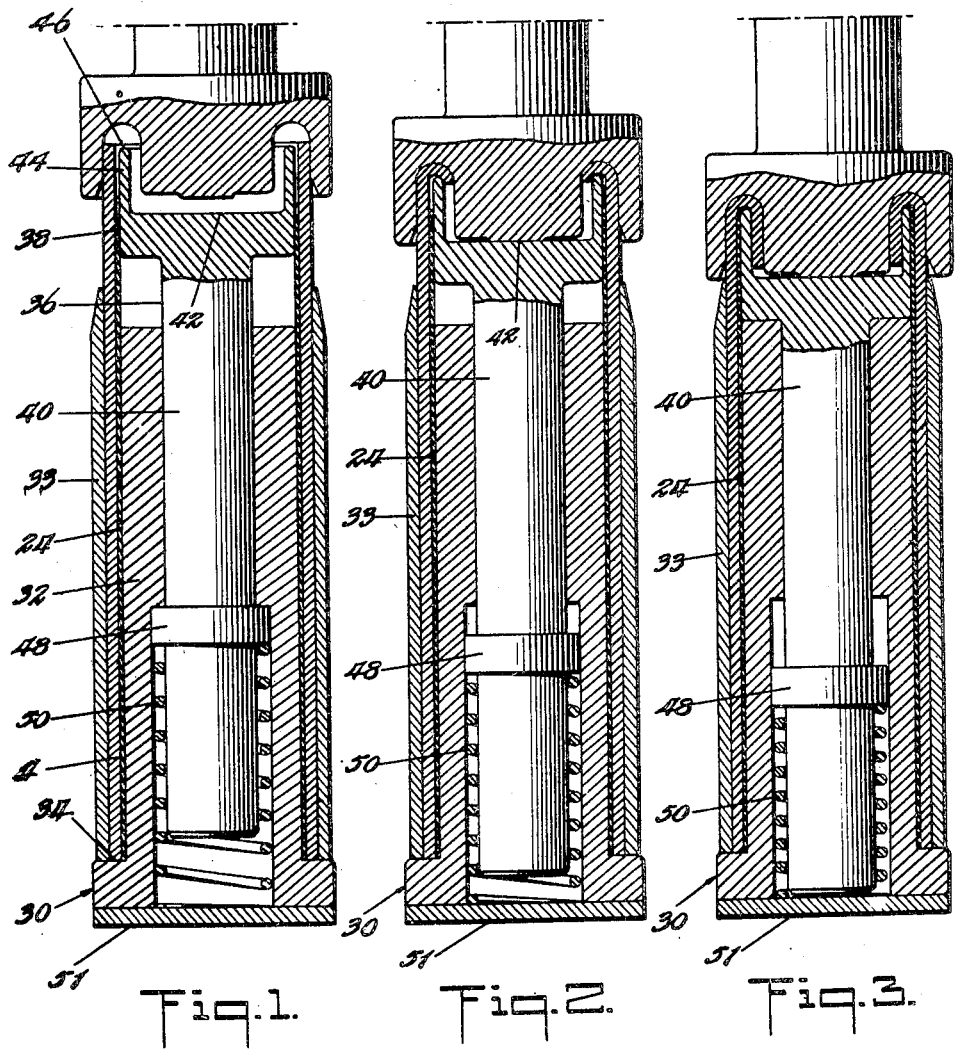
INVENTOR
PENROSE R. HOOPES
BY
George H. Mortimer
ATTORNEY Oct. 25, 1949.  P. R. HOOPES  2,485,885
COLLAPSIBLE TUBE Filed March 21, 1944  2 Sheets-Sheet 2

INVENTOR
PENROSE R. HOOPES
BY George H. Mortimer
ATTORNEY

Patented Oct. 25, 1949

2,485,885

UNITED STATES PATENT OFFICE 2,485,885

COLLAPSIBLE TUBE

Penrose R. Hoopes, Philadelphia, Pa., assignor to Colgate-Palmolive-Peet Company, Jersey City, N. J., a corporation of Delaware Application March 21, 1944, Serial No. 527,437

8 Claims. (Cl. 222—107)

The present invention relates to collapsible tubes and to a method of and apparatus for making the same. It is particularly advantageous for lined plastic tubes, but is not restricted thereto.

Plastic tubes comprising a seamless barrel secured to a dispensing head are known. In making these tubes, the heads are usually molded in dies, while the barrels are extruded as seamless tubes of indefinite lengths which are cut into short sections and secured to the heads by cement, solvents and/or heat. There are a number of difficulties connected with the manufacture and use of such tubes. The molded heads are usually of rather uniform size, but the barrels vary considerably in internal diameter. If the internal diameter is too small, difficulty is experienced in attempting to slip the barrel over the cylindrical surface of the head to which the barrel is to be secured. On the other hand, if the internal diameter is too large, a poor seal between the barrel and head results. Variations in the length of the barrel cause difficulties in manufacturing the tubes in automatic machinery. The plastic barrels and, to a certain extent, the heads have been found to be pervious to the passage of volatile materials such as moisture, perfume, flavor, etc. The head, being thicker and a molded plastic, can be made impervious to volatile ingredients by various means such as the integral casting of an inner metal thimble with the plastic so as to retain a plastic to plastic joint between the barrel and head and yet block the escape of moisture through the head itself. The use of liners for the barrels substantially improves the retension of moisture, flavor, perfume and other volatile ingredients, but where the liners are laid in the barrels loosely, a poor butt joint between the liner and head usually results, which permits considerable loss of volatile ingredients through the barrel at this point. If the liner is inserted into the head so as to overlap the joint between the head and the barrel, the overlapped ends of the liner tend to open up where the diameter of the tube changes between the head and the barrel, and in some cases the pressure of the contents is sufficient to rupture the liner in this region. It has also been found difficult to line the tubes in automatic machinery, and such lined tubes have caused operational difficulties in the automatic filling and closing machines.

The present invention has for its objects the overcoming of the foregoing difficulties in the manufacture and use of plastic collapsible tubes and the provision of plastic tubes, preferably lined, of improved structure and utility.

Other objects and advantages of the invention will be apparent from the following detailed description, taken in conjunction with the drawings in which Fig. 1 is a fragmentary sectional view through the axis of a curling tool with a tube in position to be curled; Fig. 2 is a similar view showing the parts in an intermediate position; Fig. 3 is a similar view showing the parts in the position which they occupy at the end of the curling operation; Fig. 4 is a similar view showing the parts of the curling tool separating to permit removal of the curled tube and the positioning thereon of a new tube to be curled; Fig. 5 is a fragmentary sectional view along the axis of an expanding device for sizing the curled end of the tube; and Fig. 6 is a longitudinal sectional view of an assembled tube.

Referring first to Fig. 6, the tube embodying the present invention comprises a head 2 and a barrel 4. Preferably, both the head and the barrel are made of any suitable organic plastic, such as cellulose acetate or other cellulose ester, polymerized compounds, etc. The head and barrel need not be made of the same plastic, but if different plastics are used, it is preferred to use plastics which are soluble in a common solvent in order to form a solvent bond or seal 8 between them. Other types of joints, however, such as cemented joints, heat-sealed joints, etc., which give a plastic to plastic bond are contemplated within the invention.

The head 2 preferably is molded in a die. By this method heads can be manufactured within very close tolerances. It may comprise a threaded neck 10 provided with a dispensing opening 12, a shoulder 14, and a flange 16 rabbeted at 18 to provide a cylindrical surface on which the barrel is to be sealed.

One end of the barrel 4 is curled or bent back on itself a short distance, preferably about the same as the height of the rabbet 18, forming a groove 20 at the end thereof. A liner 24 preferably is provided, but the construction of the tube has advantages even though no liner is used. The liner may comprise a sheet of material curled to cylindrical form, with the ends overlapping a short distance, or it may be made by wrapping a plurality of turns of sheet material upon a mandrel. Various lining materials may be used, as described more in detail in the MacMillan and Balkema application Serial No. 479,000, now abandoned. A preferred lining material comprises a sheet of metal foil, e. g., lead foil, tin foil, or an alloy thereof, sandwiched between layers of cellophane. Regardless of the composition and structure of the liner, one end thereof extends into the groove 20. In this way, the liner is accurately positioned and firmly held in place in the tube, which enables it to be used satisfactorily in automatic filling and closing machines.

The apparatus for making the tubes comprises means for curling an end of the barrel, e. g., one end of a length of seamless tube, back on itself, means for sizing the curled end, and means for securing the sized end to a preformed head.

The means illustrated in the drawing for curling an end of a barrel or tube and designated generally by reference numeral 30, comprises means for supporting the tube and a die.

The means for supporting the tube includes an internal support in the form of a hollow cylindrical base 32 and an external support 33 in the form of a ferrule which may be integral or split to facilitate positioning it around the tube on the base 32. The outside diameter of the base 32 is practically equal to the internal diameter of the tube to be used therewith, so as to provide an internal support for the tube which is slipped down over the cylindrical base. If a liner is to be provided in the finished tube, it is preferably placed on the base 32 before the tube 4, and the outside diameter of the base must then conform to the internal diameter of the liner instead of the tube 4. The liner preferably is shorter than the tube 4 so that it is not bent back upon itself in the curling operation, but this is not essential. In the following description, where reference is made to wall thickness of the tube, it is to be understood that this includes the thickness of the liner also if the liner is present at the place referred to. The base is enlarged at one end to form a shoulder 34, acting as a stop for the tube 4 and the outside thimble 33 when they are slipped onto the base.

Slideably mounted in the base 32 is a male die 36 having a cylindrical head 38 of the same diameter as the base 32 and a shank 40 of smaller size corresponding to the hollow or bore of the base 32. The head 38 is recessed at 42 to form an annular flange 44, the edge of which may be rounded as indicated at 46. Inward movement of the male die 36 into the cylindrical base is limited by the striking of the head 38 against the end of the base. Outward movement is limited by a stop 48, preferably in the form of a collar attached to or integral with the shank 40 and slideably mounted in an enlarged section of the bore in the base 32, as illustrated in Fig. 1 of the drawing. The male die is resiliently held at the limit of its outward movement by a spring 50, conveniently a helical spring, located within the enlarged section of the bore in base 32, pressing at one end against the collar 48 and at the other end against a closure plate 51.

Reference numeral 60 represents a female die provided with an annular groove 62. The diameter of the outer wall of this groove is approximately equal to the outside diameter of the base 32 plus twice the wall thickness of the tube to be curled in the device. The width of the groove is equal approximately to the thickness of the flange 44 plus twice the wall thickness of the tube. The bottom of the groove preferably is substantially semi-circular in section, as shown in the drawing. It is advantageous to flare the outer wall of the groove, as shown at 64, to facilitate movement of the female die over the tube, as illustrated in Fig. 1.

The base 32 and the female die 60 are mounted in means (not shown) for relative movement toward and away from each other. When the dies have been moved together in mating relation, two spaced coaxial annular cavities and a connecting cavity of substantially semi-circular section are formed. The width of these cavities is slightly larger than the wall thickness of the tube which is inserted into one of the annular cavities, around the connecting cavity, and into the other annular cavity.

Ordinarily, the tube will be of substantially circular cross section, and for that reason, in the description of the apparatus, parts have been described as cylindrical, annular, etc. It will be understood, however, that the apparatus may be used for curling tubes other than those of circular cross section, and it is to be understood that the parts may be made to conform to tubes having any desired cross section, particularly a cross section following a smooth closed curve.

In the operation of the apparatus illustrated in Figs. 1, 2, 3 and 4, a liner of desired length may be slipped over or formed on the base 32 as a mandrel in the manner already described. The liner may be inserted into the tube 4 after the end is curled back upon itself, if desired, as explained in greater detail later, but it is preferred, where a liner is used, to place it on the base 32. A section of a tube corresponding approximately to the desired length of the barrel, and which preferably is somewhat longer than the liner, as shown in the drawings, is slipped over the liner on the cylindrical base 32, and the external support 33 is placed, in turn, around the tube 4. The stop 34 should be at a position on the base such that the uncurled tube extends from the stop 34 to about the end of the flange 44, as illustrated in Fig. 1. It will be understood, of course, that the stop 34 may be made adjustable, if desired, for the manufacture of barrels having different lengths. After the liner, tube and ferrule 33 have been positioned, the dies are moved into mating relation until the center portion of the female die engages the bottom of the recess 42 of the male die. This limits the inward movement of the flange 46 into the annular groove 62, as seen in Fig. 2. Further movement causes the male die to move into the base 32 against the force of the spring 50. This forces the end of the tube around the connecting cavity, as seen in Fig. 2, and finally through the other annular cavity, as shown in Fig. 3. The speed of the relative movement of the dies is not critical but it is preferable to employ a high velocity since a percussion blow of the guiding surface against the end of the tube gives excellent results in practice and also makes a high production rate possible.

The distance from the shoulder 34 to the bottom of the groove 62 is fixed, and will be identical every time the device is operated for any particular position of the stop 34. It is this length, rather than the initial length of the tube, which determines the length of the finished collapsible tube. By this means, therefore, the length of the curled tube is accurately sized in the curling operation, and considerable variation in the length of the uncurled tube can be tolerated without any disadvantage whatsoever.

As soon as the parts have moved to the limit of their inward movement, as shown in Fig. 3, the direction of motion is reversed, and the two parts of the die move apart, as illustrated in Fig. 4. The motion of the male die, under the influence of the spring 50, lifts the end of the tube 4 and the liner 24 away from the stop 34 and permits the curled tube and the liner to be readily removed from the base 32 by ejectors (not shown) acting against the uncurled end of the tube and the adjacent end of the liner. If the liner is not placed on the base 32, it may readily be inserted into the curled tube when the latter is removed from the base 32. The groove 20 at this time is open sufficiently to receive the end of the liner. It is advantageous, however, from a production standpoint to assemble the tube and liner in the preferred manner described hereinabove.

Means, designated by reference character 70, are provided for accurately sizing and shaping the curled end of the tube. Reference numeral 72 represents a cylindrical mandrel having a shoulder or stop 74, which may be made adjustable as already described in connection with stop 34 on the base 32. The length of the cylindrical mandrel from its end to the shoulder 74 is somewhat less than the length of the curled tube from the end of the curl to the uncurled end, as illustrated in Fig. 5. An external annulus 76, and an internal annulus 78 having a tapered bore adapted to cooperate with a frusto-conical expander 80, are provided. The internal annulus 78 is rabbeted to form, with the external annulus, a groove 82. The outer wall of the groove 82 corresponds to the desired external diameter of the finished barrel, and the inner wall of the groove, when the parts are in the position shown at Fig. 5, corresponds to the diameter of the head at the rabbet 18. The internal annulus 78 is made up of a plurality of radial segments mounted for movement toward and away from the center of the annulus under the influence of the frusto-conical expander 80. The cylindrical mandrel 72 and the two annuli 76 and 78 are mounted on means, not shown, for movement toward and away from each other, as already described in connection with the apparatus of Figs. 1 and 4.

The operation of the apparatus of Fig. 5 is substantially the same whether or not a liner is used. The curled tube and its liner, where used, are placed over the mandrel 72, as illustrated in Fig. 5. The mandrel and the two annuli 76 and 78 are then brought together until the internal annulus 78 contacts the end of the mandrel 72, as shown in Fig. 5. During this motion, the curled end of the tube is inserted into the groove 82. The expander 80 then moves into the recess 84 in the end of the mandrel 72, causing the segments of the annulus 78 to move radially outwardly until they engage the inner wall of the external annulus 76, thus accurately sizing and shaping the end of the barrel. By retracting the expander 80, the parts may then be readily moved in the opposite direction to permit removal of the tube from the mandrel 72. The tube is now ready to be sealed to the head 2, and these parts may readily be assembled in automatic machinery and will give satisfactory seals in substantially every instance because of the close tolerances to which the head and barrel can be manufactured.

The barrel 4 may be made of transparent plastic, or the plastic composition may include pigments to render it opaque. Where a transparent barrel is used, the intelligence which it may be desired to display on the filled tube, may be printed on the liner, as disclosed in the Marshall application Serial No. 509,572, which has become abandoned.

Although the present invention has been described in connection with certain specific embodiments, it will be understood that modifications and variations are contemplated within the scope of the following claims.

I claim:

1. A method of making collapsible tubes comprising curling an end of a cylindrical organic plastic barrel inwardly and backwardly, inserting an organic plastic head into said end in intimate surface contact with the curled back portion, and bonding said contacting surfaces together.

2. A method of making collapsible tubes comprising forming an organic plastic head with a cylindrical sealing surface, curling an end of a cylindrical plastic barrel inwardly and backwardly, expanding the curled end to form a close fit on said sealing surface, inserting said head into said end with the sealing surface in intimate contact with the curled back portion, and sealing contacting surfaces together.

3. A die having walls forming two spaced coaxial annular cavities and a connecting cavity of substantially semi-circular cross-section, and means for forcing an end of a tube into the outer of said annular cavities, around the connecting cavity and into the other annular cavity.

4. Apparatus comprising a female die having an annular groove, an internal support for a tube, a male die mounted on an end of said support having an annular flange adapted to be inserted into said groove with the walls of said flange spaced from the walls of said groove to form two spaced coaxial annular cavities joined by a connecting cavity of substantially semi-circular cross-section, means for moving said dies toward and away from each other, and means for forcing an end of a tube on said support into the outer of said annular cavities, around the connecting cavity, and into the other annular cavity.

5. Apparatus for forming a reversed bend at the end of a tube comprising a hollow cylindrical base adapted to form an internal support for said tube, a shoulder on the outside of said cylindrical base for limiting axial motion of the tube along said base, an external support for said tube, a male die having a cylindrical head and a shank, said shank being slideably mounted for axial movement in said cylindrical base, a stop limiting the outward movement of said shank, a spring yieldingly holding the shank against said stop, the cylindrical head of said male die having a recess forming an annular flange, a female die having an annular groove, means for moving the male and female dies together with the flange inserted into said groove, and means on said female die for engaging the bottom wall of said recess to limit the movement of said flange in said groove and to move the shank of said male die into the base against the force of said spring, said flange and the walls of said groove, in mating position, forming two spaced coaxial annular cavities joined by a connecting cavity.

6. A method of making collapsible tubes comprising forming a head with a cylindrical sealing surface, curling an end of a cylindrical barrel inwardly and backwardly whereby a groove is formed, inserting an end of a liner into said groove, expanding the curled end to form a close fit on said sealing surface, inserting said head into said end with the sealing surface in intimate contact with the curled back portion, and sealing the contacting surface together.

7. A collapsible tube comprising an organic plastic barrel, an end of said barrel being curled inwardly and backwardly to form a cylindrical surface, an organic plastic head having a cylindrical surface bonded to said cylindrical surface of said curled back portion, and a loose liner in said barrel having one end extending into and held by the groove formed by the curled back portion of the barrel, said liner being substantially coextensive with said barrel.

8. A collapsible tube comprising an organic plastic barrel, an end of said barrel being curled inwardly and backwardly to form a cylindrical surface, and an organic plastic head having a cylindrical surface bonded to said cylindrical surface of said curled back portion.

PENROSE R. HOOPES.

REFERENCES CITED

The following references are of record in the file of this patent:

UNITED STATES PATENTS

| Number | Name | Date |
|---|---|---|
| 481,239 | McEwan | Aug. 23, 1892 |
| 891,642 | Tietzmann | June 23, 1908 |
| 897,970 | Faust | Sept. 8, 1908 |
| 910,257 | Wright | June 19, 1909 |
| 1,122,393 | House | Dec. 29, 1914 |
| 1,310,697 | Hill | July 22, 1919 |
| 1,415,018 | Coates | May 9, 1922 |
| 1,417,707 | Wright | May 30, 1922 |
| 1,497,190 | Moland | June 10, 1924 |
| 1,526,782 | Fleischer | Feb. 17, 1925 |
| 1,668,349 | Baum | May 1, 1928 |
| 1,776,888 | Clark | Sept. 30, 1930 |
| 1,870,903 | Giesler | Aug. 9, 1932 |
| 1,873,366 | Farrow | Aug. 23, 1932 |
| 2,006,548 | Hale | July 2, 1935 |
| 2,017,018 | Seastrom | Oct. 8, 1935 |
| 2,118,080 | Goodwin | May 24, 1938 |
| 2,169,315 | Yngve | Aug. 15, 1939 |
| 2,181,569 | Mackenzie | Nov. 28, 1939 |
| 2,184,712 | Fleissig | Dec. 26, 1939 |
| 2,215,789 | Harrison | Sept. 24, 1940 |
| 2,221,197 | Martin | Nov. 12, 1940 |
| 2,230,189 | Ferngren | Jan. 28, 1941 |
| 2,252,854 | Hubner | Aug. 19, 1941 |
| 2,259,508 | Abramson | Oct. 21, 1941 |
| 2,261,621 | Harrison | Nov. 4, 1941 |
| 2,268,462 | Sachsenroder | Dec. 20, 1941 |
| 2,274,258 | Roselle | Feb. 24, 1942 |
| 2,274,827 | Emmerich | Mar. 3, 1942 |
| 2,337,264 | Nissen | Dec. 21, 1943 |
| 2,348,871 | Wiley | May 16, 1944 |
| 2,386,498 | Ostrander | Oct. 9, 1945 |